W. E. SLOAN.
VALVE.
APPLICATION FILED JUNE 13, 1906.

977,562.

Patented Dec. 6, 1910.

Witnesses
Edward T. Wray
Lucy A. Falkenberg

Inventor
William E. Sloan
by Parker & Carter
Attorneys

UNITED STATES PATENT OFFICE.

WILLIAM E. SLOAN, OF CHICAGO, ILLINOIS, ASSIGNOR TO SLOAN VALVE COMPANY, OF CHICAGO, ILLINOIS, A CORPORATION OF ILLINOIS.

VALVE.

977,562.          Specification of Letters Patent.      Patented Dec. 6, 1910.

Application filed June 13, 1906. Serial No. 321,458.

*To all whom it may concern:*

Be it known that I, WILLIAM E. SLOAN, a citizen of the United States, residing at Chicago, in the county of Cook and State of Illinois, have invented a certain new and useful Improvement in Valves, of which the following is a specification.

My invention relates to flush valves, and has for its object to provide a new and improved device of this description.

My invention is illustrated in the accompanying drawings, wherein—

Figure 1:
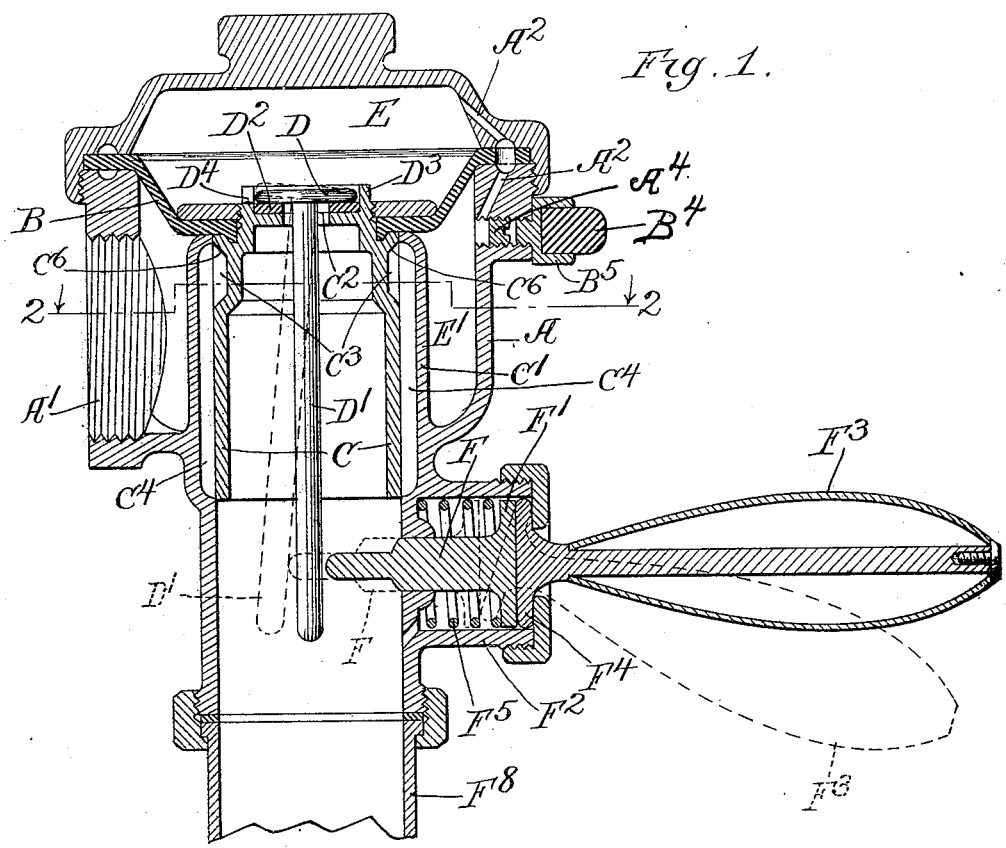
Figure 2:
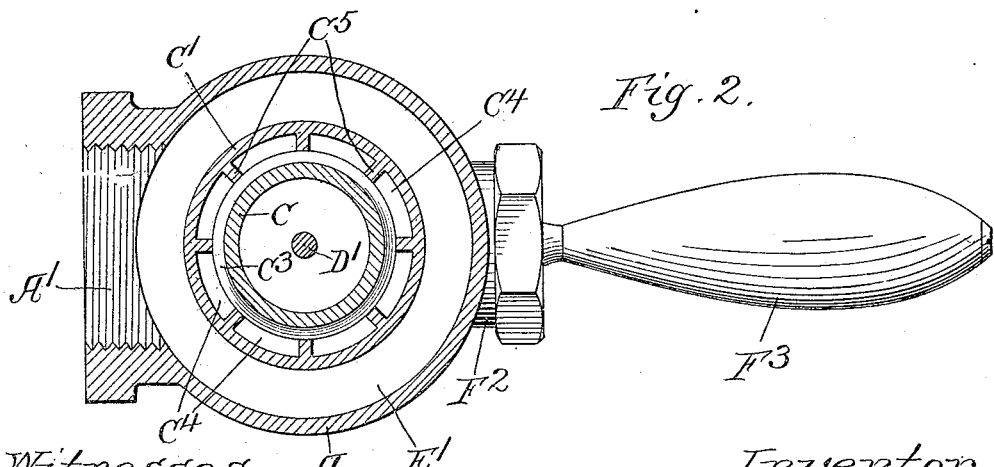

Figure 1 is a sectional view showing a form of valve embodying my invention; Fig. 2 is a sectional view taken on line 2—2 of Fig. 1.

My present valve is adapted to be used in all positions where a flush valve is desirable, such, for example, as for flushing water closets and the like.

In carrying out my invention I provide a suitable casing A having an inlet $A^1$ through which water is admitted into it. Within the casing is a diaphragm B which is preferably flexible. This diaphragm is connected in any suitable manner with a piston C working in a cylinder $C^1$. As herein shown, there is associated with the piston C a valve D provided with a stem $D^1$ which projects into the piston. The valve D controls the opening $C^2$ which connects the piston with the chamber E of the casing A. The diaphragm B divides the casing into the chambers E and $E^1$. The valve D is arranged so as to be opened when tilted, and is preferably provided with a suitable packing $D^2$. The valve or piston C is provided with the cut away part or groove $C^3$ arranged so that when the piston is partially lifted water may pass around the upper edge of the working cylinder $C^1$ and escape down into the pipe F. This groove is provided at its upper end with an inclined face $C^6$ which makes a gradual incline from the bottom of the groove to the face of the piston. The cylinder $C^1$ is preferably provided with a series of grooves $C^4$ and a series of engaging faces $C^5$ which engage the piston, the water escaping down through the grooves $C^4$. Some suitable means is provided for admitting water to the chamber E above the diaphragm B. As shown one or more openings or passageways $A^2$ is provided in the casing so as to permit the water to pass from the chamber $E^1$ to the chamber E. The valve D is opened by tilting it. Any suitable means may be provided for tilting this valve. As herein shown the valve D is actuated by means of an actuating part F arranged so as to be moved into contact with the valve stem $D^1$ so as to move it to one side and thus tilt the valve D. This actuating part may be operated in any desired manner. As herein shown it is provided with a head $F^1$ which works in a cylindrical part $F^2$ associated with the casing A. An actuating handle $F^3$ has a similar head $F^4$ which also works in said cylinder. The spring $F^5$ normally tends to move the actuating part out of its actuating position. By moving the handle $F^3$ the head $F^4$ will be inclined and will engage the head $F^1$ causing the actuating part to be thrust into the position shown in dotted lines in Fig. 1, and this causes the tilting of the valve stem and the valve.

The auxiliary valve D is provided with a suitable guiding device or the like which insures its being properly seated at all times, and re-seated when tilted. As shown in the drawings the auxiliary valve D is contained within a recess, which, as shown in Fig. 1, is formed by the guiding device $D^3$, the valve fitting somewhat loosely in this guiding device so that it can be easily tilted. The guide $D^3$ is preferably provided with openings as shown at $D^4$, through which the water may pass when the valve is slightly tilted. These openings may be formed in any desired manner, as, for example, by simply slotting the guide at intervals.

The use and operation of my invention are as follows: The device is connected in the system in the desired manner, and the water enters the chamber $E^1$. The water also passes up through the passageways $A^2$ to the chamber E. When the chamber E is filled, the valve is in equilibrium, and the diaphragm or some part associated therewith is seated upon the end of the cylinder $C^1$ to close the passageway and prevent escape of the water. The aux ate the valve, the handle $F^3$ is moved. This moves the actuating part F so as to bring it into contact with the valve stem $D^1$. The valve stem is then moved to one side and the valve D tilted as shown in dotted lines in Fig. 1. This opens the passageway $C^2$ and permits the escape of the water from the chamber E. The pressure in said chamber being thus relieved the pressure in the chamber $E^1$ causes the diaphragm B to be moved away from the cylinder $C^1$ carrying with it the piston C, the movement in this case being preferably rapid. When this movement of the piston is rapid, a small amount of water will escape when the groove $C^3$ is opposite the upper edge of the cylinder $C^1$, but it will be only a comparatively small amount. The parts are arranged so that when the diaphragm is up its maximum distance, the groove $C^3$ will be above the top of the cylinder $C^1$. When in this position the valve stem $D^1$ is above the actuating part F and out of the influence thereof, and the force of gravity moves it back to its closed position so that the valve D will be properly seated. This closes the communication leading from the chamber E. The chamber begins then to gradually fill up with water, the water passing from the chamber $E^1$ through the openings $A^2$ to chamber E. The diaphragm is now gradually moved toward the end of the cylinder $C^1$. When the groove $C^3$ comes opposite the upper edge of said cylinder the water will flow therethrough down into the pipe $F^8$ and thus to the closet or other device in connection with which the water is used. When the inclined part $C^6$ of this groove is passing the end of the cylinder $C^1$ it will be noted that the space is gradually decreased, and hence the flow of water is gradually shut off, the parts being arranged so that the last flow of water acts as a re-fill to re-fill the basin. It will thus be seen that the flush and re-fill are both accomplished by means of the same groove in the piston. When the diaphragm reaches the position shown in Fig. 1 the communication between the pipe $F^8$ and chamber $E^1$ will be cut off, and the flow of water stopped. When it is desired to again operate the valve, the handle $F^3$ will be moved to one side and the operation above described will be repeated.

It will be noted that by this construction there is no close adjustment required of the parts or of the auxiliary valve D. The speed of the upward movement of the piston and diaphragm will be regulated by the size of the opening $C^2$. The auxiliary valve automatically reseats itself before the piston or associated parts strike the top of the chamber E so that there is a water cushion which prevents jar and noise. cured by arranging the parts the actuating part F before any of the parts strike the upper part of the chamber E. The piston and diaphragm and associated parts stop automatically when the valve stem rises above the actuating part. The parts are so arranged that when the diaphragm and piston are up the groove $C^3$ is above the end of the cylinder $C^1$ and the flow of water is stopped. If, now, the actuating part should be held in its actuating position the end of the valve stem $D^1$ will strike it. The end of the valve stem is preferably rounded and the actuating part may also be rounded so that when the end of the valve stem strikes it the valve will be tilted and hence the further downward movement of the piston stopped because of the escape of the water from chamber E. This will result before the groove $C^3$ comes opposite the upper end of the cylinder $C^1$ and hence it will be impossible to hold the valve open. Means are provided for adjusting the flow of water from the chamber $E^1$ to the chamber E through the passage way $A^2$. This may be done, for example, by means of the adjusting screw $A^4$, which can be worked back and forth across the mouth of the passage way $A^2$. To insure making this connection water tight, I preferably provide the jamnut $B^5$ which can be constructed to carry the bumper $B^4$ for the seat. The central position of the handle is not essential under all circumstances as it would be possible to locate the handle in another relation with respect to the rest of the apparatus.

I claim:

1. A valve device comprising two valves, one the main valve which controls the flow of water, the other an auxiliary valve for controlling said main valve, the auxiliary valve adapted to be tilted to open it, a stem associated with said auxiliary valve, and an actuating part for moving said stem so as to tilt the valve and means for carrying the auxiliary valve beyond the control of said actuating part.

2. A valve device comprising a piston, a cylinder in which said piston works, a groove on the face of said piston, a casing containing said piston and cylinder, a diaphragm dividing said casing into two chambers, a communication between the chamber on one side of the diaphragm and said piston, a valve controlling said communication, a stem connected with said valve, an actuating device for moving the stem to one side so as to tilt the valve to open it and means for carrying the auxiliary valve beyond the control of said actuating device.

3. A valve device comprising a main valve which controls the flow of water, an auxiliary valve for controlling the main valve, said auxiliary valve provided with a stem, an actu to one side so as to tilt the auxiliary valve to open it and means for carrying the auxiliary valve beyond the control of said actuating device.

4. A valve device comprising a casing, a diaphragm therein dividing the casing into two chambers, a piston connected with said diaphragm, a cylinder in which said piston works, an opening through said diaphragm, a valve controlling said opening, a stem connected with said valve and projecting through said opening into said piston, a movable part below the piston adapted to be moved so as to engage said stem and move it laterally to tilt the valve and means for carrying said auxiliary valve beyond the control of said movable part.

5. A valve device comprising a casing, a diaphragm therein dividing the casing into two chambers, a piston connected with said diaphragm, a cylinder in which said piston works, an opening through said diaphragm, a valve controlling said opening, a stem connected with said valve and projecting through said opening into said piston, a movable part below the piston adapted to be moved so as to engage said stem and move it laterally to tilt the valve, a groove on the exterior of said piston having a gradually inclined face at its upper end so that the flow of water is gradually shut off to make the re-fill and means for carrying said auxiliary valve beyond the control of said movable part.

6. A flush valve device comprising a casing, a diaphragm extending thereacross, a main valve connected with said diaphragm and which controls the flow of water, a discharge leading from the upper chamber in said casing, a tilting valve controlling said discharge, a stem connected with said valve, an actuating device adapted to be moved so as to engage said stem and move it laterally to tilt the valve so as to open said discharge, and a communication between the two chambers so that water may flow from one to the other and means for carrying the auxiliary valve beyond the control of said actuating device.

7. A flush valve device comprising a casing, a movable diaphragm therein dividing the casing into two chambers, a main valve associated with said diaphragm, an opening through said diaphragm, an auxiliary tilting, self-closing valve controlling said opening, a stem connected with said auxiliary valve and projecting through said opening, an actuating device for moving said stem so as to tilt the auxiliary valve, and means for preventing the main valve from being held open.

8. A flush valve device comprising a casing, a diaphragm therein dividing the casing into two chambers, a main valve associated with said diaphragm, an opening through said diaphragm, an auxiliary tilting valve controlling said opening and mounted upon said main valve, a stem connected with said auxiliary valve and projecting through said opening, an actuating device for moving said stem so as to tilt the auxiliary valve so as to release the pressure in the chamber above the diaphragm and permit the diaphragm and auxiliary valve to be moved upwardly, said stem having a rounded end adapted to engage the actuating device if it is held in its actuating position when the diaphragm descends, the engagement of said rounded end causing the auxiliary valve to tilt so as to prevent the main valve from being held in its open position.

9. A flush valve device comprising a casing, a diaphragm extending thereacross, a main valve controlled by said diaphragm, an auxiliary valve associated with said diaphragm, a stem for said valve, an actuating device for engaging said stem so as to move it to one side and tilt the valve, and a guide for said auxiliary valve which insures its proper re-seating.

10. A flush valve device comprising a casing, a diaphragm extending thereacross, a main valve controlled by said diaphragm, an auxiliary tilting valve associated with said diaphragm, a stem for said valve, an actuating device for engaging said stem so as to move it to one side and tilt the valve, a guide for said auxiliary valve which insures its proper re-seating, and openings through said guide through which the water may pass when the valve is slightly tilted.

11. A valve device comprising two valves, one the main valve which controls the flow of water, the other a self-closing tilting valve carried by the main valve, and means for actuating said tilting valve to open it.

12. A valve device comprising a main valve which controls the flow of water, a self-closing tilting auxiliary valve for controlling the main valve and mounted thereon, an actuating device for said auxiliary valve by means of which it is tilted to set the main valve in operation, the auxiliary valve carried out of reach of the actuating device when the main valve is operated so as to be free to automatically return to its closed position.

13. A valve device comprising a main valve and a tilting auxiliary valve, an actuating device for said tilting auxiliary valve, and means for moving said tilting auxiliary valve out of reach of said actuating device.

14. A valve device comprising two valves, one the main valve which controls the flow of water through the device, the other an auxiliary tilting valve mounted upon the main valve, said tilting valve having two movements, one a tilting movement and the other a movement in the direction of its length, and means for tilting the auxiliary valve while in position on the main valve.

15. A valve device comprising two valves, one the main valve which controls the flow of water through the device, the other a tilting valve mounted upon the main valve and carried therewith, an actuating device for tilting said tilting valve to open it, and means for automatically closing the tilting valve.

WILLIAM E. SLOAN.

Witnesses:
LUCY A. FALKENBERG,
ABBIE E. JOHNSON.